United States Patent
Dullien et al.

(10) Patent No.: US 11,720,468 B1
(45) Date of Patent: Aug. 8, 2023

(54) UNWINDING PROGRAM CALL STACKS FOR PERFORMANCE PROFILING

(71) Applicant: Elasticsearch B.V., Amsterdam (NL)

(72) Inventors: Thomas Dullien, Zurich (CH); Sean Heelan, Oxford (GB)

(73) Assignee: Elasticsearch B.V., Amsterdam (NL)

(*) Notice: Subject to any disclaimer, the term of this patent is extended or adjusted under 35 U.S.C. 154(b) by 0 days.

(21) Appl. No.: 17/192,765

(22) Filed: Mar. 4, 2021

Related U.S. Application Data

(60) Provisional application No. 62/984,946, filed on Mar. 4, 2020, provisional application No. 62/984,987, filed on Mar. 4, 2020.

(51) Int. Cl.
    *G06F 11/34*    (2006.01)
    *G06F 8/41*    (2018.01)

(52) U.S. Cl.
    CPC .......... *G06F 11/3414* (2013.01); *G06F 8/41* (2013.01)

(58) Field of Classification Search
    CPC .............................. G06F 11/3414; G06F 8/41
    USPC ........................................................ 717/139
    See application file for complete search history.

(56) References Cited

U.S. PATENT DOCUMENTS

| | | | | |
|---|---|---|---|---|
| 6,126,328 A * | 10/2000 | Mallory | .............. | G06F 11/3664 714/E11.21 |
| 8,229,726 B1 * | 7/2012 | Magdon-Ismail | ...... | G06F 30/33 703/22 |
| 2003/0182655 A1 * | 9/2003 | Hundt | .................. | G06F 9/4486 717/157 |
| 2004/0163077 A1 * | 8/2004 | Dimpsey | ............. | G06F 11/3466 717/130 |
| 2006/0037003 A1 * | 2/2006 | Long | ................... | G06F 9/45504 717/148 |
| 2009/0055813 A1 * | 2/2009 | Haber | .................. | G06F 8/4441 717/158 |
| 2015/0347271 A1 | 12/2015 | Payne et al. | | |
| 2015/0370560 A1 * | 12/2015 | Tan | ....................... | G06F 9/4552 717/148 |
| 2019/0007493 A1 | 1/2019 | Gray et al. | | |
| 2019/0108036 A1 | 4/2019 | Texeira et al. | | |
| 2020/0218553 A1 | 7/2020 | D'Souza et al. | | |

OTHER PUBLICATIONS

Frederickson, Ben "Profiling Native Python Extensions", Sep. 27, 2019, pp. 1-4.

"GDB Utilities for HHVM", retrieved from https://github.com/facebook/hhvm/tree/master/hphp/tools/gdb) on Jun. 23, 2021.

(Continued)

*Primary Examiner* — Chat C Do
*Assistant Examiner* — Bradford F Wheaton
(74) *Attorney, Agent, or Firm* — Quinn IP Law

(57) ABSTRACT

Functionality is provided for unwinding program call stacks across native-to-interpreted code and native-to-JIT-compiled code boundaries, as well as across the kernel and user space boundaries, during performance profiling. The system thus enables profiling of code that crosses boundaries from native code to interpreted languages and native code to languages that run on a runtime supporting JIT compilation. Various embodiments provide cross-language profiling with a sufficiently low performance impact so as to enable such profiling to take place in a production environment.

36 Claims, 4 Drawing Sheets

(56) References Cited

OTHER PUBLICATIONS

Bastian, Theophile et al., "Reliable and Fast DWARF-Based Stack Unwinding", Proceedings of the ACM on Programming Languages, ACM, 2019, pp. 1-25.
Nardelli, Francesco "Tales from Binary Formats", Jan. 26, 2018, pp. 1-133.
"[Patch 7/7] DWARF: add the config option", retrieved from https://lwn.net/Articles/728347/ on Jun. 23, 2021.
Talbot, David et al., "Bloom maps", Oct. 29, 2018, pp. 1-15.
Porat, Ely "An Optimal Bloom Filter Replacement Based on Matrix Solving", Apr. 11, 2008, pp. 1-13.
Putze, Felix et al., "Cache-, Hash- and Space-Efficient Bloom Filters", 2007, pp. 1-14.

\* cited by examiner

UNWINDING PROGRAM CALL STACKS FOR PERFORMANCE PROFILING

CROSS-REFERENCE TO RELATED APPLICATION

The present application claims the benefit of U.S. Provisional Application Ser. No. 62/984,946 for "Unwinding Program Call Stacks for Performance Profiling", filed on Mar. 4, 2020, which is incorporated by reference herein in its entirety.

The present application claims the benefit of U.S. Provisional Application Ser. No. 62/984,987 for "Profiling by Unwinding Stacks from Kernel Space Using Exception Handling Data", filed on Mar. 4, 2020, which is incorporated by reference herein in its entirety.

The present application is related to U.S. Utility application Ser. No. 17/192,803, for "Profiling by Unwinding Stacks from Kernel Space Using Exception Handling Data", filed on the same date as the present application, which is incorporated by reference herein in its entirety.

TECHNICAL FIELD

The present document relates to software performance analysis techniques, including performance profiling.

BACKGROUND

Modern computing has brought many interpreted programming languages back into production, as the performance of modern computers has allowed programs to be fast enough to run such interpreted languages without unduly impairing performance. For some tasks and applications, however, performance is at a premium; therefore, native code compiled from languages like C and C++ remains popular.

Alongside pure interpreted languages and pure static compilation are runtimes that support Just-In-Time (JIT) compilation: such runtimes take bytecode as input, similar to an interpreter, but may decide on the fly to compile the bytecode to native code in order to boost performance. Examples of such runtimes include the OpenJDK Hotspot Java Virtual machine and JavaScript runtimes provided in many web browsers.

Runtimes that support JIT compilation often provide compilers for multiple languages. These compilers are able to compile into bytecode for a particular runtime; for example, both the Scala and Java languages can be compiled to run on the OpenJDK Hotspot Java Virtual Machine.

Modern software often consists of code derived from multiple programming languages in the same program. For example, a JIT-compiled Java program may call natively compiled C code, which may in turn call interpreted Python code, which may in turn call additional natively compiled C code. Many other permutations and combinations of language and runtime combinations are feasible.

One technique in software performance analysis is sampling profiling, usually done by sampling profilers. Such programs stop the program under examination at regular intervals, and inspect the call stack of the program, which is typically a stack of all function invocations in a particular programming language. The data from the call stack is then post-processed to show the programmer how much time is spent executing various portions of the code, such as in each function or sequence of function invocations.

In real-world scenarios, having mixed-language stacks is often important or useful, as is having stacks that cover both the kernel and user space aspects of software's execution. For example, if a piece of Python code calls into a C++ library that then does a significant amount of computational work, including calling into the kernel via a system call, the full stack (e.g. the path of functions invoked inside Python, the path of functions invoked inside C++, and the path of functions in the kernel) may be of relevance to the programmer in analyzing performance. However, existing profilers can generally only deal with one language at a time, because the stack unwinding functionality (i.e., the ability to construct and analyze a stack for a sequence of functions) only unwinds stacks in one programming language. For the same reason, existing profilers also cannot generally provide call stacks that transition from non-native user space code (e.g. Python) into kernel code, as the kernel code is native code and the profilers have no mechanism to cross the language boundary.

Existing approaches fail to provide any mechanism for profiling performance across multiple languages with sufficiently low overhead to be used in a production environment.

SUMMARY

In various embodiments, the system and method described herein provide functionality for unwinding (i.e., constructing) program call stacks across native-to-interpreted code and/or native-to-JIT-runtime boundaries during performance profiling. The system and method are thus able to profile code that cross boundaries from native code to interpreted languages, and from native code to languages that are executed in a runtime supporting JIT compilation. The system and method can also profile code that transitions back from interpreted or JIT-compiled code (including Java code) to native code. In at least one embodiment, the described system provides cross-language profiling with a sufficiently low performance impact so as to enable such profiling to take place in a production environment.

Furthermore, in at least one embodiment, the system and method described herein can support construction of profiles that cover both the kernel and user space, where the user space code can include interpreted code and/or JIT-compiled code.

Further details and variations are described herein.

BRIEF DESCRIPTION OF THE DRAWINGS

The accompanying drawings, together with the description provided below, illustrate several embodiments. One skilled in the art will recognize that the particular embodiments illustrated in the drawings and described herein are merely exemplary, and are not intended to limit scope.

DETAILED DESCRIPTION OF THE EMBODIMENTS

Figure 1:
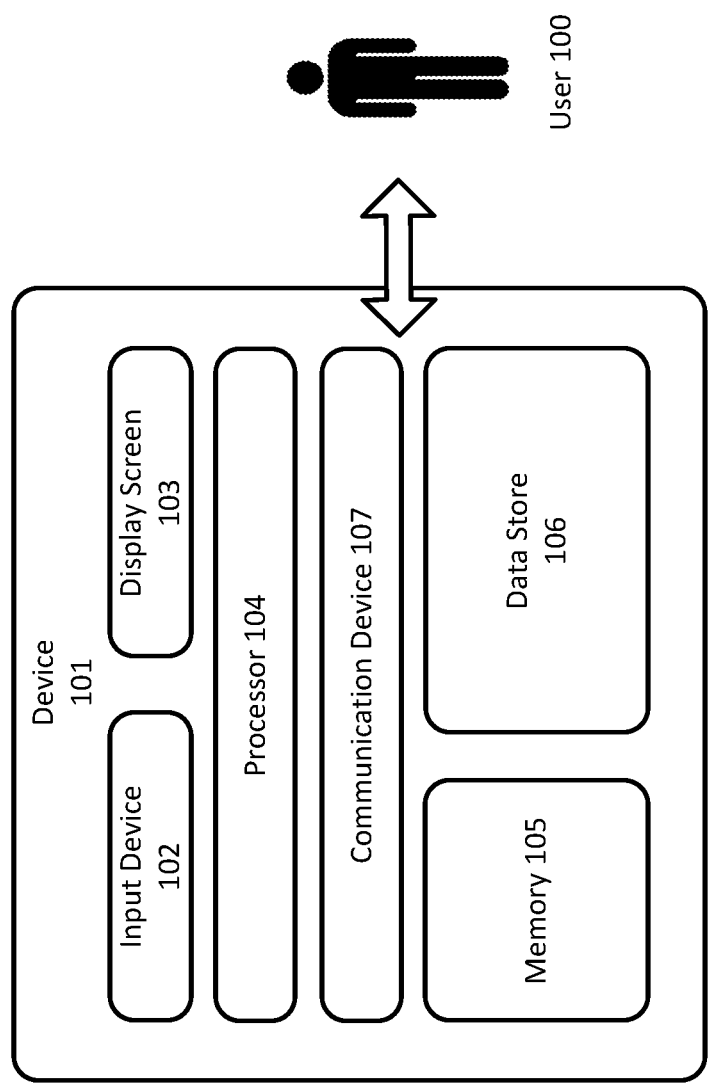
FIG. 1 is a block diagram depicting a hardware architecture for implementing the techniques described herein according to one embodiment.

For ease of description, statically compiled native machine code, as generated for example by a C or C++ compiler, is referred to herein as "native code," while machine code emitted by a Just-In-Time (JIT) compiler is referred to as "JIT-compiled code."

Furthermore, when discussing profiling of runtimes that support JIT compilation, the following description refers to the construction of stacks from the JIT-compiled machine code. However, such runtimes may also support interpretation of bytecode without JIT compilation. Accordingly, it should be understood that the descriptions herein that refer to profiling of JIT-compiled runtimes are also intended to refer to methods that can handle stacks consisting of frames from both JIT-compiled code and interpreted bytecode for a runtime.

In various embodiments, the techniques described herein can be applied in the context of a sampling profiler that can be used on a call stack that includes any combination of statically compiled native code, interpreted code, and JIT-compiled code. Although the techniques are described herein in terms of a sampling profiler, one skilled in the art will recognize that such techniques can also be applied to other contexts.

One skilled in the art will further recognize that the techniques described herein can be implemented in a stand-alone device, client/server architecture, distributed network environment, and/or any other suitable architecture.

In some embodiments, one or more components, as shown and described below in connection with FIGS. 1 and 2, may be used to implement the system and method described herein. Such components may be implemented in a cloud computing-based client/server architecture, using, for example, Amazon Web Services, an on-demand cloud computing platform available from Amazon.com, Inc. of Seattle, Wash. For illustrative purposes, the system and method are described herein in the context of such an architecture. One skilled in the art will recognize, however, that the system and method can be implemented using other architectures, such as for example a stand-alone computing device rather than a client/server architecture.

Further, the functions and/or method steps set forth below may be carried out by software running on one or more of device 101, client device(s) 108, server 110, and/or other components. This software may optionally be multi-function software that is used to retrieve, store, manipulate, and/or otherwise use data stored in data storage devices such as data store 106, and/or to carry out one or more other functions.

For purposes of the description herein, a "user", such as user 100 referenced herein, is an individual, enterprise, or other group, which may optionally include one or more users. A "data store", such as data store 106 referenced herein, is any device capable of digital data storage, including any known hardware for nonvolatile and/or volatile data storage. A collection of data stores 106 may form a "data storage system" that can be accessed by multiple users. A "computing device", such as device 101 and/or client device(s) 108, is any device capable of digital data processing. A "server", such as server 110, is a computing device that provides data storage, either via a local data store, or via a connection to a remote data store. A "client device", such as client device 108, is an electronic device that communicates with a server, provides output to user 100, and accepts input from user 100.

System Architecture

According to various embodiments, the system and method can be implemented on any electronic device or set of interconnected electronic devices, each equipped to receive, store, retrieve, and/or present information. Each electronic device may be, for example, a server, desktop computer, laptop computer, smartphone, tablet computer, and/or the like. As described herein, some devices used in connection with the system described herein are designated as client devices, which are generally operated by end users. Other devices are designated as servers, which generally conduct back-end operations and communicate with client devices (and/or with other servers) via a communications network such as the Internet. In at least one embodiment, the methods described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 includes a number of hardware components well-known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store data related to native code, interpreted code, call stacks, and/or any other information that may be used in performing the methods described herein. In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. In at least one embodiment, data store 106 may be implemented using cloud-based storage architectures such as NetApp (available from NetApp, Inc. of Sunnyvale, Calif.), Amazon S3 (available from Amazon, Inc. of Seattle, Wash.) and/or Google Drive (available from Google, Inc. of Mountain View, Calif.).

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

Display screen 103 can be any element that displays information such as text and/or graphical elements. In particular, display screen 103 may display a user interface for presenting information regarding performance profiling including cross-language profiling reports, and/or for prompting user 100 to configure such reports. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

A communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 2:
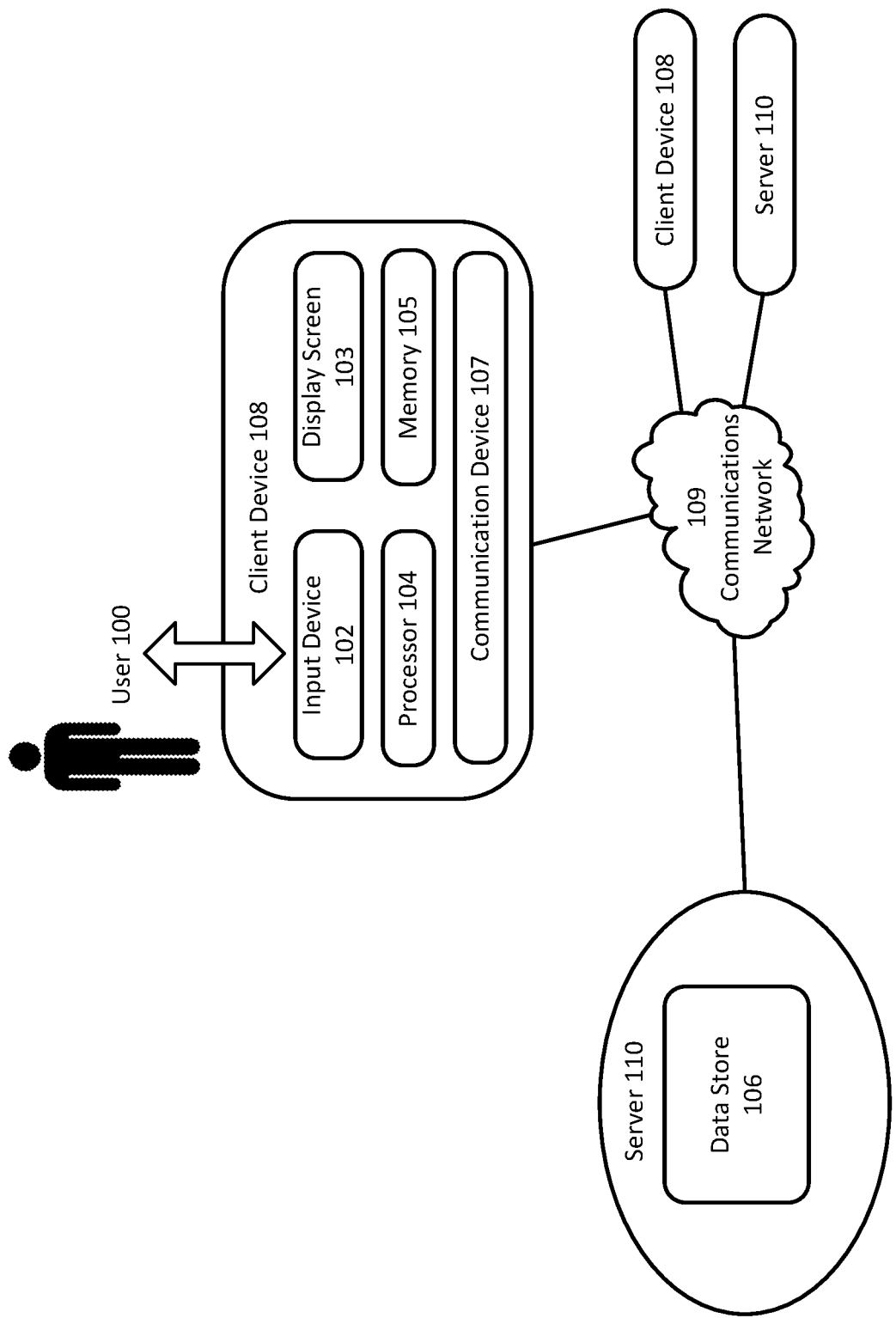
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), 557, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 is responsible for data storage and processing, and incorporates data store 106. Server 110 may include additional components as needed for retrieving data from data store 106 in response to requests from client device 108.

As also set forth in FIG. 1, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1, data store 106 may store data depicting cost models for compression algorithms, and/or other information that may be used in performing the methods described herein; alternatively, such data can be stored elsewhere (such as at another server) and retrieved as needed.

In addition to or in the alternative to the foregoing, data may also be stored in a data store 106 present in client device 108. In some embodiments, such data may include elements distributed between server 110 and client device 108 and/or other computing devices in order to facilitate secure and/or effective communication between these computing devices.

As also set forth in FIG. 1, display screen 103 can be any element that displays information such as text and/or graphical elements. Various user interface elements, dynamic controls, and/or the like may be used in connection with display screen 103.

As also set forth in FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as also set forth in the description of FIG. 1.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In one embodiment, some or all components of the system can be implemented in software written in any suitable computer programming language, whether in a standalone or client/server architecture. Alternatively, some or all components may be implemented and/or embedded in hardware.

Software Architecture

Figure 3:
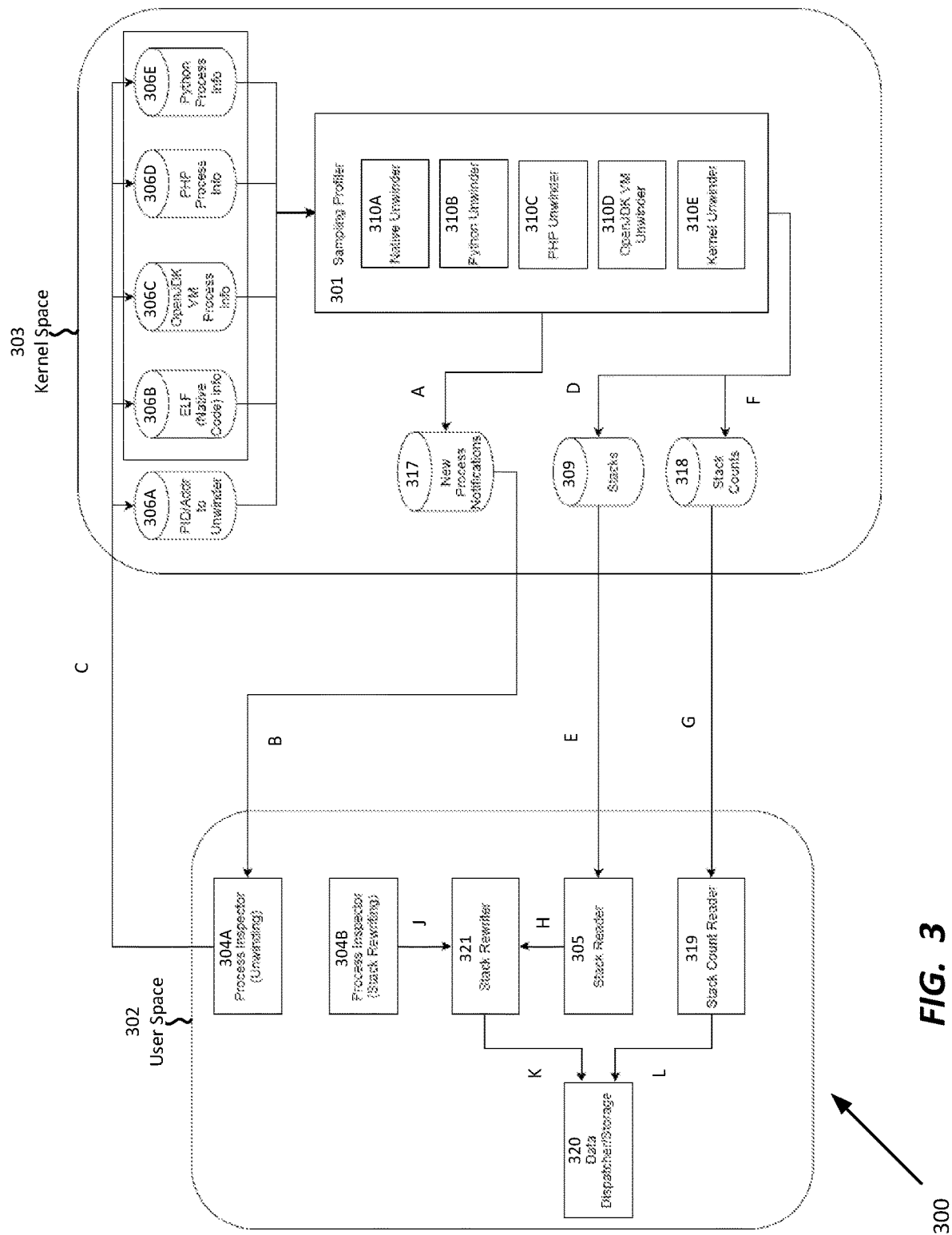
FIG. 3 is a block diagram depicting a software architecture for implementing the techniques described herein according to one embodiment.

Referring now to FIG. 3, there is shown a block diagram depicting a software architecture for implementing the system described herein, according to one embodiment. The depicted architecture can be used to support profiling of stacks containing any combination of native code, interpreted code (such as, for example, Python or PHP code), and JIT-compiled code (such as, for example, Java running on the OpenJDK Hotspot Virtual Machine). In the depicted architecture, sampling profiler 301 is implemented as a combination of several extended Berkeley Packet Filter (eBPF) programs running within kernel space 303, and supported by multiple components in user space 302. Such components may include, for example, process inspector (unwinding) 304A, process inspector (stack rewriting) 304B, stack rewriter 321, stack reader 305, stack count reader 319, and data dispatcher/storage 320.

In at least one embodiment, process inspector (unwinding) 304A iterates over all live processes and populates five eBPF maps: PID/Addr to Unwinder map 306A, ELF (Native Code) Info map 306B, OpenJDK VM Process Info map 306C, PHP Process Info map 306D, and Python Process Info map 306E.

In at least one embodiment, these maps fall into two categories. The first category includes PID/Addr to Unwinder map 306A, which maps a pair consisting of a Process ID (PID) and address within that processes address space to an identifier which indicates which unwinder should be used for that address. The second category includes maps that provide data required to unwind (i.e., construct) a particular stack in a particular process; this includes maps 306B through 306E. Each of maps 306A through 306E is described in turn.

PID/Addr to Unwinder map 306A maps process IDs and address pairs to an identifier designating which unwinder to use for that address whenever the address is encountered as a frame in a native stack. In at least one embodiment, map 306A indicates whether a frame is within the main interpreter loop of an interpreter or in a JIT-compiled page in a JIT-compiled runtime. This information is used by the system to determine whether it needs to switch from unwinding native code to unwinding the stack of that particular interpreter or runtime. The granularity of the address designation can be varied according to requirements. For example, if a process with ID 10 has both a PHP and a Python interpreter loaded in its address space, with the main interpreter loop of the Python interpreter at addresses 0x1000-0x4000, the main interpreter loop of the PHP interpreter at addresses 0x4000-0 x5000 and native code at addresses 0x5000-0x6000, and the map is using page level granularity, then the map may contain the following entries: {(10, 0x1000)→UNWIND_PYTHON, (10, 0x2000)→UNWIND_PYTHON, (10, 0x3000)→UNWIND_PYTHON, (10, 0x4000)→UNWIND_PHP, (10, 0x5000)→UNWIND_NATIVE}.

ELF (Native Code) Info map 306B maps process IDs (for all processes) to a data structure that provides the starting and ending address in the memory of each process for every mapped .text section from ELF files, along with the information required to unwind native code stacks from each ELF file. This allows the eBPF component to determine the relevant .text section, and thus ELF file, given a process ID and instruction pointer, and thus facilitates unwinding of this code.

OpenJDK VM Process Info map 306C maps process IDs of processes that contain a Java Virtual Machine to a variety of virtual machine data structures required to unwind stacks in JIT-compiled code, as well as data structures required to unwind stacks involving bytecode that has not been JIT-compiled.

PHP Process Info map 306D maps process IDs of processes that contain a PHP interpreter to address ranges that indicate the main interpretation loop that the PHP interpreter is executing, as well as an address in the PHP processes address space that contains the data structures necessary to unwind the PHP stack. For example, in the case of PHP version 7, this is the address of the executor_globals variable.

Python Process Info map 306E maps process IDs of processes that contain a Python interpreter to address ranges that indicate the main interpretation loop of the Python interpreter is executing, as well as an address in the Python processes address space that contains the data structures necessary to unwind the PHP stack. For example, in the case of Python 3.6, this information includes the autoTLSkey and _PyThreadState_Current variables.

In at least one embodiment, maps 306A through 306E may be populated on demand (step A): the first time sampling profiler 301 encounters a new process, it generates new process notification 317 which is sent to process inspector (unwinding) 304A in user space 302 (step B), which then extracts the required data from those processes and populates maps 306A through 306E (step C).

As shown in the example of FIG. 3, sampling profiler 301 may include a number of modules or sub-programs: native unwinder 310A for unwinding native frames, Python unwinder 310B for unwinding Python frames, PHP unwinder 310C for unwinding PHP frames, OpenJDK VM unwinder 310D for unwinding frames for languages compiled to particular virtual machines (e.g. Java, Scala, and the like), and kernel unwinder 310E for unwinding native kernel frames. In at least one embodiment, sampling profiler 301 includes a main loop that calls each module 310A through 310E as required.

In at least one embodiment, each time a stack is constructed, it is hashed to compute a hash that uniquely identifies it. The first time a new stack is encountered (from stacks 309), its contents are sent to stack reader 305 within user space 302 (steps D, E). In at least one embodiment, stacks 309 are conveyed via an eBPF map, although any other suitable technique can be used. On future occasions that the same stack is encountered, instead of sending the stack contents to stack reader 305 within user space 302, a counter is updated in stack counts 318 (steps F, G) which maps stack hashes to counts. In this manner, the system avoids repeatedly sending the same stack, thus saving on the amount of data transferred.

Stack reader 305 and stack count reader 319, both running in user space 302, read stack contents 309 and stack counts 318 as sent by sampling profiler 301. For stack counts 318, stack count reader 319 reads the hashes and corresponding counts from the eBPF map and sends this information to data dispatcher/storage 320, which either stores the information or dispatches it over a network (such as network 109) to another application.

For stack contents 309, stack reader 305 passes the information to stack rewriter 321 (step H). Depending on which unwinder 310A through 310E extracted the stack frames, stack rewriter 321 may need to perform further processing to complete the information available in each stack frame. As an example, for Python, sampling profiler 301 may generate Python stack frames that refer to a particular Python file and a bytecode offset within that file. However, user 100 may want the result to be a Python file and a line within that file. Accordingly, in such a situation, stack rewriter 321 may extract information from the running Python process, or from the Python file, that allows stack rewriter 321 to convert the bytecode offset to a line number, and replace the old frame in the stack with a new one containing the line number. The facility of reading the required data from the memory of a running process is provided by process inspector (stack rewriting) 304B (step J).

In at least one embodiment, once stack frames have been updated as necessary, the entire stack is hashed again, in order to compute a new hash that factors in the new information. This also allows for sampling profiler 301 to use a hash width/hash function that avoids collisions on the local machine, while also allowing the hash computed by stack rewriter 321 to be more robust in order to avoid global collisions. Once stack rewriting and re-hashing is complete, stack contents can then be dispatched or stored by data dispatcher/storage 320 along with stack counts (steps K, L).

Stacks can then be accumulated, aggregated, and/or otherwise processed according to known techniques.

In at least one embodiment, data dispatcher/storage 320 uses a hashing technique similar to the approach described above in connection with transmission of stack contents to user space 302. Specifically, in order to avoid repeatedly sending the same stack data over network 109 to data store 106 or some other backend storage solution, data dispatcher/storage 320 can use the hash of a stack to determine whether the stack contents have previously been transmitted. If not, dispatcher/storage 320 sends the stack contents. However, in at least one embodiment, if the stack contents have previously been transmitted, dispatcher/storage 320 can send a count instead, which represents the number of times the stack has been seen since it was last encountered and reported. Such an approach has the advantage of significantly cutting down the amount of data to be transferred, particularly when the same stack contents are repeatedly encountered.

Method

In at least one embodiment, the described system profiles call stacks that include native, interpreted, and JIT-compiled code by identifying points during the native code unwinding process when the main interpreter loop of an interpreted language is encountered or where code that has been JIT-compiled is encountered. While unwinding a native stack, sampling profiler 301 determines when it has encountered the main interpreter loop of an interpreter, or code that has been JIT-compiled. In at least one embodiment, sampling profiler 301 makes this determination using the contents of PID/Addr to Unwinder map 306A, which specifies which unwinder 310 to use for a particular address. In at least one embodiment, the data in map 306A is populated by process inspector (unwinding) 304A. At the points specified by map 306A, sampling profiler 301 switches to specialized code that unwinds the interpreter stack or the JIT-compiled stack, as appropriate.

In various embodiments, the method for unwinding a particular interpreted or JIT-compiled stack may vary based on the interpreter or the runtime in question. For example, the unwinding process may involve following any of a variety of data structures that are internal to a particular interpreter or runtime.

In at least one embodiment, sampling profiler 301 begins the unwinding process by obtaining the addresses in memory of the data structure(s) that the interpreter or runtime uses to record its call stack; such addresses can be provided, for example, by PHP process info map 306D, Python process info map 306E, and/or the like.

As described above, in at least one embodiment, sampling profiler 301 generates as output a single call stack 309 that spans native, interpreted, and JIT-compiled code, as well as user space code and kernel code. Sampling profiler 301 may also generate stack counts 318 which indicate how many times each stack 309 has been encountered.

Figure 4:
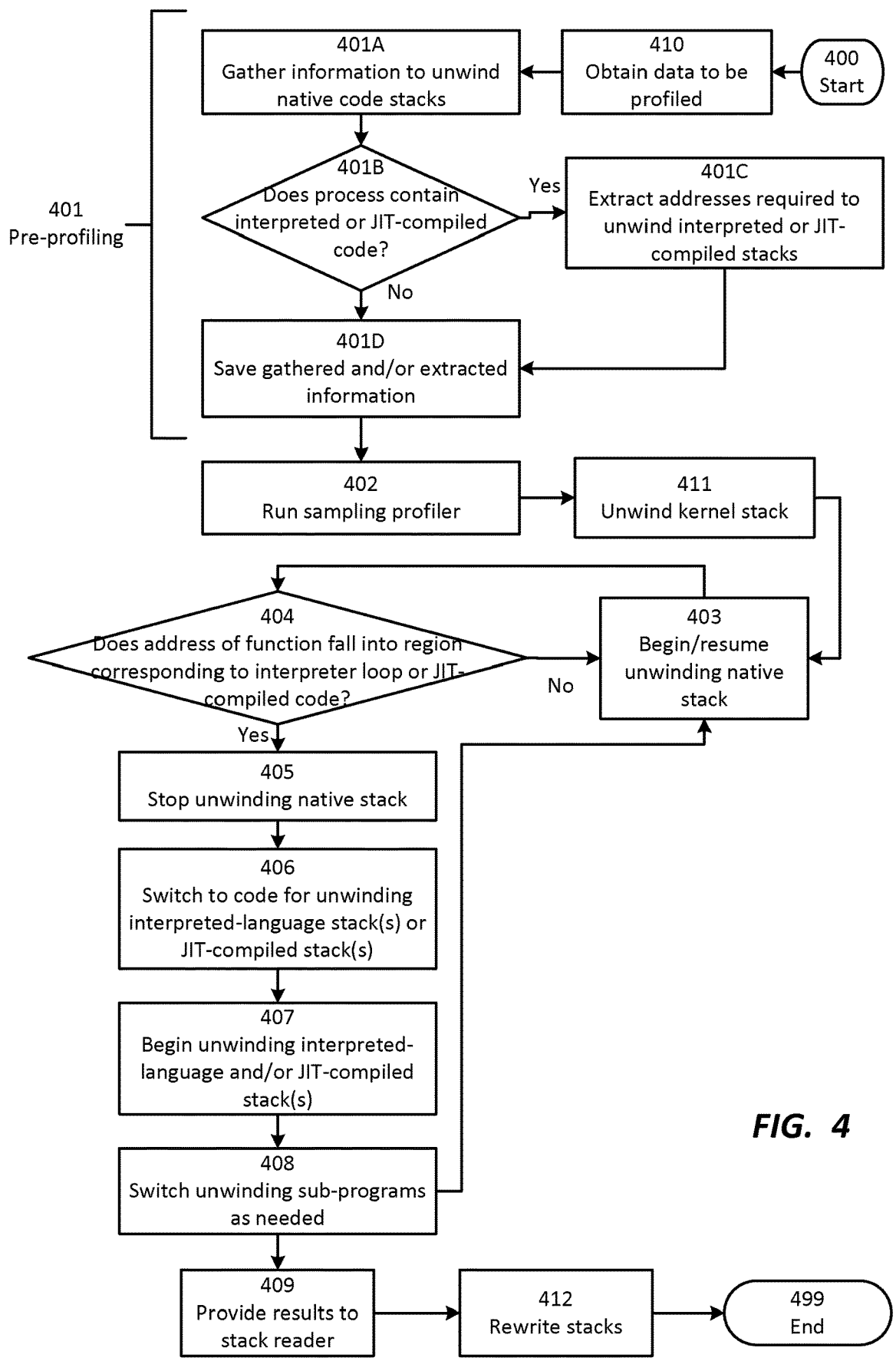
FIG. 4 is a flow diagram depicting an overall method for implementing the techniques described herein according to one embodiment.

Referring now also to FIG. 4, there is shown a flow diagram depicting an overall method for implementing the techniques described herein according to one embodiment. One skilled in the art will recognize that the particular steps depicted in FIG. 4 are merely exemplary, and that the techniques described herein can be performed using other method steps and/or using steps in a different order.

The depicted method can be implemented on any suitable hardware device or combination of devices, such as on a stand-alone device, client/server architecture, distributed network environment, and/or any other suitable architecture. In some embodiments, the depicted method can be performed using hardware and software architectures such as those shown in FIGS. 1, 2, and/or 3; however, one skilled in the art will recognize that other suitable hardware and software architectures may be used.

The method begins 400, and data representing one or more processes to be profiled is obtained 410; such data may include, for example, a compiled binary representing a running process and/or any compiled libraries.

In at least one embodiment, a pre-profiling step 401 is performed, in which, for each live process on the target system, the system gathers 401A information that may be required to unwind native code stacks within the process being profiled. This may include, for example, gathering information required to unwind native stacks in binaries that have been compiled in a manner that omits frame pointers (referred to herein as "frame-pointer omitted binaries"). Pre-profiling step 401 may also include determining 401B whether the process contains interpreted or JIT-compiled code (for example, by scanning for loaded libraries from interpreters or JIT runtimes); if so, the system extracts 401C any addresses that may be required in order to unwind any interpreted-language stacks or JIT-compiled stacks. The system also populates PID/Addr to Unwinder map 306A, which indicates which unwinder should be invoked for each PID and address combination that may be encountered during native code unwinding. This information is saved 401D so that it is accessible by the profiling code.

Alternatively, the system can be implemented in an on-demand fashion, whereby it does not scan for live processes in advance, but rather populates maps when a process is encountered for the first time.

Once pre-profiling step 401 is performed, the system may run 402 sampling profiler 301. In at least one embodiment, sampling profiler 301 may be run at regular intervals; alternatively, it may be run in response to a command by a user (such as user 100), administrator, or any other entity.

In at least one embodiment, whenever sampling profiler 301 is run 402, kernel unwinder 310E first runs to unwind 411 the kernel stack, if there is one. In at least one embodiment, the Linux kernel provides a mechanism to retrieve the kernel stack via an API accessible through eBPF. Then, native unwinder 310A begins unwinding 403 the native stack (the stack containing machine code). For each address of a function that native unwinder 310 unwinds, it checks 404 whether this address falls into a set of predefined regions that correspond to the interpreter loop of the interpreted language (such as Python, PHP, Ruby, and/or the like), or a page of JIT-compiled native code (such as code produced by a JIT-compiled runtime such as the OpenJDK Hotspot VM).

If the address falls into such a predefined region, native unwinder 310A stops 405 unwinding the native stack, and switches 406 to other code that instructs sampling profiler 301 as to how to unwind the interpreted-language or JIT-compiled stack(s). Otherwise, native unwinder 310 continues 403 unwinding the native stack.

In at least one embodiment, a separate stack unwinding subprogram is provided for native code as well as for each interpreter and JIT runtime. As described above in connection with FIG. 3, such sub-programs may include, for example, native unwinder 301A, Python unwinder 310B, PHP unwinder 310C, OpenJDK VM unwinder 310D, kernel unwinder 310E, and/or the like. In at least one embodiment, all of these unwinder sub-programs 310 use the same interface to the target process that they are unwinding. In particular, they may have arbitrary read access to the memory areas associated with the process. This allows unwinders 310 to be integrated into a single program that can seamlessly switch from unwinding native code to unwinding interpreted code.

In at least one embodiment, unwinders 310 use the Linux Kernel's eBPF system to run code in kernel space and to perform unwinding from this eBPF code.

As described above, appropriate unwinders 310 unwind 407 the interpreted-language or JIT runtime VM stack(s). If appropriate, the system may switch 408 from one unwinding sub-program to another as needed. However, in at least one embodiment, the system does not switch from unwinding one interpreted-language program (or JIT-compiled program) directly to another. Rather, once unwinding of a first interpreted language program (or JIT-compiled program) completes, the system returns to unwinding of native code, which can then invoke unwinding of the next interpreted language program (or JIT-compiled program). Such an arrangement may be appropriate because in many environments interpreted programs cannot directly call each other, without at least one native code frame appearing in the stack.

In at least one embodiment, once unwinding of the interpreted-language stack is complete, the system resumes 403 unwinding the native stack. As unwinding of the native stack continues, the process of dispatching to various unwinders 310 for interpreted or JIT-compiled code continues, as appropriate, in order to construct stacks that may involve various combinations and permutations of native, interpreted and JIT-compiled code.

Once stacks have been constructed, the result can be provided 409 to stack reader 305. In at least one embodiment, stacks 309 are provided to stack reader 305 (in user space 302) via an eBPF map. Stack reader 305 reads the stacks from the eBPF map and optionally passes the data to stack rewriter 321, which can optionally rewrite 412 stacks as described in more detail above. Such rewriting can be helpful, for example, to allow the system to handle Python traces by replacing data produced by sampling profiler 301 with stack frame data that may be more useful to user 100. The result can be provided 409 to stack reader 305 (or to data dispatcher/storage 320) for review by a user such as user 100.

As discussed previously in connection with FIG. 3, in at least one embodiment, stacks are hashed as they are constructed. The first time a new stack is encountered, its full contents, including all the stack frames contained therein, and all associated metadata, are provided 409 to stack reader 305 (or to data dispatcher/storage 320) via box 309. In at least one embodiment, an entry is also made for the stack in a map that records counts for each stack, by mapping the hash of the stack to a count 318 indicating how many times that stack has been encountered. Subsequently, whenever the same stack is encountered again (which can be detected by checking for its hash), count 318 for that stack is incremented and the stack contents need not be sent again.

The method then ends 499.

Example Pseudo-Code

The following pseudo-code sets forth an example of operation of the kernel-space stack construction components 303 of FIG. 3, according to one embodiment. For illustrative purposes, the pseudo-code sets forth the process for constructing PHP and native stacks; similar processes can be used for Python and/or other interpreted languages, as well as JIT-compiled languages/runtimes.

In at least one embodiment, the procedure is implemented in eBPF so that it has a minimal performance impact on the operation and performance of the target system. For performance profiling, the eBPF code can be controlled by a timer interrupt that allows it to run at a particular frequency.

For illustrative purposes, the following pseudo-code depicts an implementation of kernel-space unwinding of a stack consisting of kernel, native, and PHP frames, but omits the mechanism to transition from unwinding interpreted frames back to native frames. In addition, for clarity, user-space population of maps, reading from maps, and rewriting are omitted.

The depicted pseudo-code makes use of the following support functions:

GetTextSection: Reads from ELF (Native Code) Info map 306B to map a process ID and instruction address to an object describing the native code that is loaded at that address. Given a process ID and an instruction address within that process, this process provides the text section from an ELF file that is loaded at that location.
  getEGAddress: Makes use of the PHP Process Info map and returns the address of the data structure (the executor_globals) within a PHP process that is required to unwind the stack.
  writeStackToOutputMap: Computes the hash of a constructed stack and updates its count in stack counts 318. If the hash has not been seen before the stack contents are written to stacks 309 (which may be an eBPF map), so that it can be read by stack reader 305.
  addKernelStack: Uses an API provided by the Linux kernel to retrieve the kernel stack component. This can be done in eBPF using the bpf_get_stackid function.
  getUnwinderForPIDAddr: Makes use of PID/Addr to Unwinder map 306A to determine which unwinder to use for a particular process and address combination.

```
// Unwind is the entry point to the profiler and is called at a configurable frequency.
func Unwind(processID, registers) {
    // The eBPF program is called with a copy of the machine context for the
    // executing process at the point where the interrupt occurs
    currIP=registers.InstructionPointer
    // Initialize an empty call stack to contain the result
    stack=CreateEmptyStack( )
    // Retrieve the kernel stack, if there is one, using APIs provided by the
    // Linux kernel
    addKernelStack(stack)
    unwinder=UNKNOWN
    do {
        // Determine based on the current instruction pointer which unwinder
        // should be invoked at the current stack frame
        unwinder=getUnwinderForPIDAddr(processID, currIP) switch (unwinder) {
        case UNWIND_NATIVE:
            currIP=UnwindOneNativeFrame(processID, registers, stack)
            break
        case UNWIND_PHP:
            UnwindPHP(processID, registers, stack)
            // In this example pseudo-code we support a stack consisting of
            // (optional) kernel frames, (optional) native frames, and
            // then (optional) PHP frames. As explained elsewhere, and shown
            // in FIGS. 3 and 4, the implementation may also support
            // returning to unwinding native frames, and then back to
            // interpreted (or JIT-compiled) frames thereafter, repeating
            // as many times as necessary. Here we simply halt unwinding
            // after the first set of interpreted frames.
            unwinder=UNWIND_STOP
            break
    } while (unwinder !=UNWIND_STOP && currIP !=0)
    writeStackToOutputMap(stack)
}
func UnwindPHP(processID, registers, stack) {
    filePath=""
    lineNum=0
    // executorGlobals is the address of the executor_globals data structure
    // within this PHP process. It contains the info required to walk the call
    // stack.
    executorGlobals=getEGAddress(processID)
    // The stack frame data for the first frame is contained in the
    // executor_globals.current_execute_data field
    executeData=readMem(executorGlobals+OFFSET_CURR_EXECUTE_DATA)
    while executeData !=0 {
        // The PHP file path and line number for this frame can be extracted
        // from the 'executeData' data structure (and its substructures)
        file=extractFilePathFromExecuteData(executeData)
        lineNum=extractLineNumFromExecuteData(executeData)
        // We have the current stack frame info, so push it and move onto the
        // next
        stack.pushPHPFrame(file, lineNum)
        // The next 'executeData' to process is linked from the current one
        executeData=readMem(executeData+OFFSET_PREV_EXECUTE_DATA, 8)
    }
}
func UnwindOneNativeFrame(processID, registers, stack) {
    // For brevity, in this example implementation we assume that the process
    // that we are unwinding the stack for consists of code that has been
    // compiled with frame pointers. Alternatively, the stack can be unwound
    // for code without frame pointers.
    rsp=registers.RBP+8
    rip=readMem(registers.RBP+8, 8)
    rbp=readMem(registers.RBP, 8)
    registers.RSP=rsp
    registers.RBP=rbp
    // From the process ID and the current instruction pointer, we retrieve
    // metadata on the text section this corresponds to, and the offset of the
    // IP within that text section. This data is retrieved from an eBPF map
    // that has been populated by the user-space component. A 'text section'
    // refers to a .text section within an ELF file.
    textSection, offset=GetTextSection(processID, rip)
    if textSection==INVALID_RIP {
        Return 0
    }
    // A native frame is identified by a text section in an ELF, and an offset within
    // that.
    stack.pushNativeFrame(textSection, offset)
    return rip
}
```

Advantages

The described system provides several advantages over previous systems, including improved performance, functionality, correctness, and generality.

Performance: In at least one embodiment, the described system can be implemented as a kernel-level eBPF program, so that it has minimal overhead. This allows sampling profiler 301 to be executed potentially hundreds of times a second in order to get a statistically significant sampling, even on production systems. As the same main loop is used to drive the execution of the native stack as well as interpreted stacks, JIT-compiled stacks, user space stacks, and kernel stacks, the described system uses significantly less overhead than previous approaches. It is not necessary, for example, to unwind the stacks separately and then stitch them back together.

Functionality: As the system can be implemented as a kernel-level eBPF program it can provide programmers with stack traces that can reach from kernel-mode native code via user-mode native code into interpreted language and JIT-compiled code. The system can thus provide useful, specific information such as, for example "the reason why this Python function that calls this C code does not return is because of a deadlock in the kernel". Furthermore, the described system can handle multiple interpreter types and JIT-compiled runtimes using the same core mechanism, and is not limited to merely analyzing native code and a single other interpreted language. All that is required for each new interpreter type or JIT-compiled runtime is code to inspect processes of the relevant interpreter/JIT-compiled runtime to extract the address ranges that indicate that the interpreter main loop or JIT-compiled code is being executed and should be unwound, code to extract the addresses of variables in memory that are required to unwind stacks for that interpreter/JIT-compiled runtime, and code to unwind a stack for that interpreter, given the ability to arbitrarily read memory locations for that process. This can then be directly connected to the native code unwinding mechanism, and the stack unwinder for the correct interpreter or JIT-compiled runtime can be dispatched as required.

Correctness: As set forth above, the described system includes native unwinder 310A, kernel unwinder 310E, as well as unwinders 310B, 310C, 310D for each interpreter or JIT-compiled runtime. In at least one embodiment, each such sub-program has an identical interface to the target process that it is unwinding; namely, it has arbitrary read access to that process's memory space. Thus, in at least one embodiment, these sub-programs can be integrated into a single program, and executed as a single program that can switch as needed from executing native stack unwinding to unwinding of an interpreted/JIT-compiled stack. In addition, the described system avoids the requirement that the native stack be unwound before the Python stack can be unwound. Rather, in the described system, the success or failure of unwinding native code has no impact on the success of unwinding interpreted or JIT-compiled code. While in the described pseudo-code, PHP unwinder 310C is only invoked if native unwinder 310A can reach a stack frame that is associated with an interpreter, it is possible to directly invoke the unwinder for any of the interpreted languages as long as the eBPF map for that language has been populated with the required information to perform stack unwinding for the current process.

Generality: Existing systems fail to provide any cross-language stack unwinding mechanisms that can be directly integrated with one another in a manner that allows handling of native code, interpreted code, and JIT-compiled code. By contrast, the described system provides a cross-language stack unwinder that is easily extendable to new interpreted languages or JIT-compiled runtimes.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; MacOS, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for performance profiling, comprising:
   a) at a processor, using a sampling profiler to begin unwinding a native stack associated with at least one process to be profiled;
   b) at the processor, responsive to a determination that an address of an instruction encountered during the unwinding of the native stack falls within a range of addresses associated with interpreted code:
   stopping unwinding the native stack;
   automatically switching to code for unwinding the interpreted code, wherein automatically switching to code for unwinding the interpreted code comprises:
      identifying an unwinder for the interpreted language found in the interpreted code; and
      initiating the identified unwinder for the interpreted language found in the interpreted code;
   unwinding the interpreted code; and
   responsive to a determination that unwinding of the interpreted code is complete, resuming unwinding of the native stack;
   c) at the processor, responsive to a determination that an address of an instruction encountered during the unwinding of the native stack falls within a range of addresses associated with Just-In-Time-compiled (JIT-compiled) code:
   stopping unwinding the native stack;
   automatically switching to code for unwinding the JIT-compiled code, wherein automatically switching to code for unwinding the JIT-compiled code comprises:
      identifying an unwinder for the JIT-compiled language found in the JIT-compiled code; and
      initiating the identified unwinder for the JIT-compiled language found in the JIT-compiled code;
   unwinding the JIT-compiled code; and
   responsive to a determination that unwinding of the JIT-compiled code is complete, resuming unwinding of the native stack; and
   d) providing results of the unwinding to a stack reader.

2. The method of claim 1, wherein:
   automatically switching to code for unwinding the interpreted code comprises automatically switching to an interpreted language unwinder;
   unwinding the interpreted code comprises using the interpreted language unwinder;
   automatically switching to code for unwinding the JIT-compiled code comprises automatically switching to an JIT-compiled language unwinder; and
   unwinding the JIT-compiled code comprises using the JIT-compiled language unwinder.

3. The method of claim 1, further comprising, at the processor, prior to beginning unwinding of the native stack, pre-profiling the obtained code.

4. The method of claim 1, wherein steps a) through d) are performed automatically at regular intervals.

5. The method of claim 1, wherein steps a) through d) are performed in response to user input.

6. The method of claim 1, wherein steps a) through d) are performed in response to a trigger event.

7. The method of claim 1, further comprising:
   responsive to encountering an interpreted language process to be profiled, populating at least one map identifying ranges of addresses associated with interpreted code; and
   responsive to encountering a JIT-compiled process to be profiled, populating at least one map identifying ranges of addresses associated with JIT-compiled code.

8. The method of claim 1, further comprising, prior to step a), requesting a kernel stack associated with the at least one process to be profiled.

9. The method of claim 1, wherein the native stack references code associated with at least two different computer languages, and wherein each computer language is selected from the group consisting of:
   an interpreted language; and
   a JIT-compiled language.

10. The method of claim 9, wherein the JIT-compiled language is Java.

11. A computer-implemented method for performance profiling, comprising:
   a) requesting a kernel stack associated with at least one process to be profiled;
   b) at a processor, using a sampling profiler to begin unwinding a native stack associated with the at least one process to be profiled;
   c) at the processor, responsive to a determination that an address of an instruction encountered during the unwinding of the native stack falls within a range of addresses associated with interpreted code:
   stopping unwinding the native stack;
   automatically switching to code for unwinding the interpreted code, wherein automatically switching to code for unwinding the interpreted code comprises:
      identifying an unwinder for the interpreted language found in the interpreted code; and
      initiating the identified unwinder for the interpreted language found in the interpreted code;
   unwinding the interpreted code; and
   responsive to a determination that unwinding of the interpreted code is complete, resuming unwinding of the native stack;
   d) responsive to encountering an interpreted language process to be profiled, sending a notification identifying the interpreted language process from the kernel space profiler to a process inspector;
   e) at the processor, responsive to a determination that an address of an instruction encountered during the unwinding of the native stack falls within a range of addresses associated with Just-In-Time-compiled (JIT-compiled) code:
   stopping unwinding the native stack;
   automatically switching to code for unwinding the JIT-compiled code, wherein automatically switching to code for unwinding the JIT-compiled code comprises:
      identifying an unwinder for the JIT-compiled language found in the JIT-compiled code; and
      initiating the identified unwinder for the JIT-compiled language found in the JIT-compiled code;
   unwinding the JIT-compiled code; and
   responsive to a determination that unwinding of the JIT-compiled code is complete, resuming unwinding of the native stack;
   f) responsive to encountering a JIT-compiled process to be profiled, sending a notification identifying the JIT-compiled process from the kernel space profiler to the process inspector; and
   g) providing results of the unwinding to a stack reader.

12. A computer-implemented method for performance profiling, comprising:
   a) at a processor, using a sampling profiler to begin unwinding a native stack associated with at least one process to be profiled;
   b) at the processor, responsive to a determination that an address of an instruction encountered during the unwinding of the native stack falls within a range of addresses associated with interpreted code:
   stopping unwinding the native stack;
   automatically switching to code for unwinding the interpreted code, wherein automatically switching to code for unwinding the interpreted code comprises:
      identifying an unwinder for the interpreted language found in the interpreted code; and
      initiating the identified unwinder for the interpreted language found in the interpreted code;
   unwinding the interpreted code; and
   responsive to a determination that unwinding of the interpreted code is complete, resuming unwinding of the native stack;
   c) at the processor, responsive to a determination that an address of an instruction encountered during the unwinding of the native stack falls within a range of addresses associated with Just-In-Time-compiled (JIT-compiled) code:
   stopping unwinding the native stack;
   automatically switching to code for unwinding the JIT-compiled code, wherein automatically switching to code for unwinding the JIT-compiled code comprises:
      identifying an unwinder for the JIT-compiled language found in the JIT-compiled code; and
      initiating the identified unwinder for the JIT-compiled language found in the JIT-compiled code;
   unwinding the JIT-compiled code; and
   responsive to a determination that unwinding of the JIT-compiled code is complete, resuming unwinding of the native stack;
   d) upon completion of unwinding of a stack:
   generating a hash of the stack;
   determining whether the generated hash matches a previously stored hash;
   responsive to the generated hash matching a previously stored hash, incrementing a count associated with the previously stored hash; and
   responsive to the generated hash not matching a previously stored hash, storing the hash and initializing a count associated with the stored hash; and
   e) providing results of the unwinding to a stack reader;
   wherein step e) comprises:
      providing stack contents to the stack reader; and
      providing counts associated with the stack contents to a stack count reader.

13. A non-transitory computer-readable medium for performance profiling, comprising instructions stored thereon, that when per formed by a hardware processor, perform the steps of:
   a) using a sampling profiler to begin unwinding a native stack associated with at least one process to be profiled;
   b) responsive to a determination that an address of an instruction encountered during the unwinding of the native stack falls within a range of addresses associated with interpreted code:
   stopping unwinding the native stack;
   automatically switching to code for unwinding the interpreted code, wherein automatically switching to code for unwinding the interpreted code comprises automatically switching to an interpreted language unwinder;
   unwinding the interpreted code, wherein unwinding the interpreted code comprises using the interpreted language unwinder; and
   responsive to a determination that unwinding of the interpreted code is complete, resuming unwinding of the native stack;

c) responsive to a determination that an address of an instruction encountered during the unwinding of the native stack falls within a range of addresses associated with Just-In-Time-compiled (JIT-compiled) code:
stopping unwinding the native stack;
automatically switching to code for unwinding the JIT-compiled code, wherein automatically switching to code for unwinding the JIT-compiled code comprises automatically switching to an JIT-compiled language unwinder;
unwinding the JIT-compiled code, wherein unwinding the JIT-compiled code comprises using the JIT-compiled language unwinder; and
responsive to a determination that unwinding of the JIT-compiled code is complete, resuming unwinding of the native stack; and
d) providing results of the unwinding to a stack reader.

14. The non-transitory computer-readable medium of claim 13, wherein:
automatically switching to code for unwinding the interpreted code comprises:
identifying an unwinder for the interpreted language found in the interpreted code; and
initiating the identified unwinder for the interpreted language found in the interpreted code; and
automatically switching to code for unwinding the JIT-compiled code comprises:
identifying an unwinder for the JIT-compiled language found in the JIT-compiled code; and
initiating the identified unwinder for the JIT-compiled language found in the JIT-compiled code.

15. The non-transitory computer-readable medium of claim 13, further comprising instructions stored thereon, that when performed by the hardware processor, perform the step of, prior to beginning unwinding of the native stack, pre-profiling the obtained code.

16. The non-transitory computer-readable medium of claim 13, wherein steps a) through d) are performed automatically at regular intervals.

17. The non-transitory computer-readable medium of claim 13, wherein steps a) through d) are performed in response to user input.

18. The non-transitory computer-readable medium of claim 13, wherein steps a) through d) are performed in response to a trigger event.

19. The non-transitory computer-readable medium of claim 13, further comprising instructions stored thereon, that when performed by the hardware processor, perform the steps of:
responsive to encountering an interpreted language process to be profiled, populating at least one map identifying ranges of addresses associated with interpreted code; and
responsive to encountering a JIT-compiled process to be profiled, populating at least one map identifying ranges of addresses associated with JIT-compiled code.

20. The non-transitory computer-readable medium of claim 13, further comprising instructions stored thereon, that when performed by the hardware processor, perform the step of, prior to step a), requesting a kernel stack associated with the at least one process to be profiled.

21. A non-transitory computer-readable medium for performance profiling, comprising instructions stored thereon, that when performed by a hardware processor, perform the steps of:
a) requesting a kernel stack associated with at least one process to be profiled;
b) using a sampling profiler to begin unwinding a native stack associated with at least one process to be profiled;
c) responsive to a determination that an address of an instruction encountered during the unwinding of the native stack falls within a range of addresses associated with interpreted code:
stopping unwinding the native stack;
automatically switching to code for unwinding the JIT-compiled code, wherein automatically switching to code for unwinding the JIT-compiled code comprises:
identifying an unwinder for the JIT-compiled language found in the JIT-compiled code; and
initiating the identified unwinder for the JIT-compiled language found in the JIT-compiled code;
unwinding the interpreted code; and
responsive to a determination that unwinding of the interpreted code is complete, resuming unwinding of the native stack;
d) responsive to encountering an interpreted language process to be profiled, sending a notification identifying the interpreted language process from the kernel space profiler to a process inspector;
e) responsive to a determination that an address of an instruction encountered during the unwinding of the native stack falls within a range of addresses associated with Just-In-Time-compiled (JIT-compiled) code:
stopping unwinding the native stack;
automatically switching to code for unwinding the JIT-compiled code, wherein automatically switching to code for unwinding the JIT-compiled code comprises:
identifying an unwinder for the JIT-compiled language found in the JIT-compiled code; and
initiating the identified unwinder for the JIT-compiled language found in the JIT-compiled code;
unwinding the JIT-compiled code; and
responsive to a determination that unwinding of the JIT-compiled code is complete, resuming unwinding of the native stack;
f) responsive to encountering a JIT-compiled process to be profiled, ending a notification identifying the JIT-compiled process from the kernel space profiler to the process inspector; and
g) providing results of the unwinding to a stack reader.

22. The non-transitory computer-readable medium of claim 21, wherein the native stack references code associated with at least two different computer languages, and wherein each computer language is selected from the group consisting of:
an interpreted language; and
a JIT-compiled language.

23. The non-transitory computer-readable medium of claim 22, wherein the JIT-compiled language is Java.

24. A non-transitory computer-readable medium for performance profiling, comprising instructions stored thereon, that when performed by a hardware processor, perform the steps of:
a) using a sampling profiler to begin unwinding a native stack associated with at least one process to be profiled;
b) responsive to a determination that an address of an instruction encountered during the unwinding of the native stack falls within a range of addresses associated with interpreted code:
stopping unwinding the native stack;
automatically switching to code for unwinding the interpreted code, wherein automatically switching to code for unwinding the interpreted code comprises:

identifying an unwinder for the interpreted language found in the interpreted code; and initiating the identified unwinder for the interpreted language found in the interpreted code;

unwinding the interpreted code; and responsive to a determination that unwinding of the interpreted code is complete, resuming unwinding of the native stack;

c) responsive to a determination that an address of an instruction encountered during the unwinding of the native stack falls within a range of addresses associated with Just-In-Time-compiled (JIT-compiled) code:

stopping unwinding the native stack;

automatically switching to code for unwinding the JIT-compiled code, wherein automatically switching to code for unwinding the JIT-compiled code comprises:

identifying an unwinder for the JIT-compiled language found in the JIT-compiled code; and initiating the identified unwinder for the JIT-compiled language found in the JIT-compiled code;

unwinding the JIT-compiled code; and responsive to a determination that unwinding of the JIT-compiled code is complete, resuming unwinding of the native stack;

d) upon completion of unwinding of a stack:

generating a hash of the stack;

determining whether the generated hash matches a previously stored hash;

responsive to the generated hash matching a previously stored hash, incrementing a count associated with the previously stored hash; and responsive to the generated hash not matching a previously stored hash, storing the hash and initializing a count associated with the stored hash; and e) providing results of the unwinding to a stack reader;

wherein step e) comprises:

providing stack contents to the stack reader; and providing counts associated with the stack contents to a stack count reader.

25. A system for performance profiling, comprising:

a stack reader; and a storage device;

a processor, communicatively coupled to the stack reader, configured to:

a) run a sampling profiler to begin unwinding a native stack associated with at least one process to be profiled;

b) responsive to a determination that an address of an instruction encountered during the unwinding of the native stack falls within a range of addresses associated with interpreted code, perform the steps of:

stopping unwinding the native stack;

automatically switching to code for unwinding the interpreted code, wherein automatically switching to code for unwinding the interpreted code comprises automatically switching to an interpreted language unwinder;

unwinding the interpreted code, wherein unwinding the interpreted code comprises using the interpreted language unwinder; and responsive to a determination that unwinding of the interpreted code is complete, resuming unwinding of the native stack;

c) responsive to a determination that an address of an instruction encountered during the unwinding of the native stack falls within a range of addresses associated with Just-In-Time-compiled (JIT-compiled) code, perform the steps of:

stopping unwinding the native stack;

automatically switching to code for unwinding the JIT-compiled code, wherein automatically switching to code for unwinding the JIT-compiled code comprises automatically switching to an JIT-compiled language unwinder;

unwinding the JIT-compiled code, wherein unwinding the JIT-compiled code comprises using the JIT-compiled language unwinder; and responsive to a determination that unwinding of the JIT-compiled code is complete, resuming unwinding of the native stack; and d) provide results of the unwinding to the stack reader.

26. The system of claim 25, wherein:

automatically switching to code for unwinding the interpreted code comprises:

identifying an unwinder for the interpreted language found in the interpreted code; and initiating the identified unwinder for the interpreted language found in the interpreted code; and automatically switching to code for unwinding the JIT-compiled code comprises:

identifying an unwinder for the JIT-compiled language found in the JIT-compiled code; and initiating the identified unwinder for the JIT-compiled language found in the JIT-compiled code.

27. The system of claim 25, wherein the processor is further configured to, prior to the sampling profiler beginning unwinding of the native stack, pre-profile the obtained code.

28. The system of claim 25, wherein the processor is configured to perform steps a) through d) automatically at regular intervals.

29. The system of claim 25, wherein the processor is configured to perform steps a) through d) in response to user input.

30. The system of claim 25, wherein the processor is configured to perform steps a) through d) in response to a trigger event.

31. The system of claim 25, wherein the processor is further configured to:

responsive to encountering an interpreted language process to be profiled, populate at least one map identifying ranges of addresses associated with interpreted code; and responsive to encountering a JIT-compiled process to be profiled, populate at least one map identifying ranges of addresses associated with JIT-compiled code.

32. The system of claim 25, wherein the processor is further configured to, prior to step a), request a kernel stack associated with the at least one process to be profiled.

33. A system for performance profiling, comprising:

a stack reader;

a storage device;

a process inspector;

a processor, communicatively coupled to the stack reader and to the process inspector, configured to:

a) request a kernel stack associated with at least one process to be profiled;

b) run a sampling profiler to begin unwinding a native stack associated with at least one process to be profiled;

c) responsive to a determination that an address of an instruction encountered during the unwinding of the native stack falls within a range of addresses associated with interpreted code, perform the steps of:

stopping unwinding the native stack;
automatically switching to code for unwinding the interpreted code, wherein automatically switching to code for unwinding the interpreted code comprises:
identifying an unwinder for the interpreted language found in the interpreted code; and
initiating the identified unwinder for the interpreted language found in the interpreted code;
unwinding the interpreted code; and
responsive to a determination that unwinding of the interpreted code is complete, resuming unwinding of the native stack;
d) responsive to encountering an interpreted language process to be profiled, send a notification identifying the interpreted language process from the kernel space profiler to the process inspector;
e) responsive to a determination that an address of an instruction encountered during the unwinding of the native stack falls within a range of addresses associated with Just-In-Time-compiled (JIT-compiled) code, perform the steps of:
stopping unwinding the native stack;
automatically switching to code for unwinding the JIT-compiled code, wherein automatically switching to code for unwinding the JIT-compiled code comprises:
identifying an unwinder for the JIT-compiled language found in the JIT-compiled code; and
initiating the identified unwinder for the JIT-compiled language found in the JIT-compiled code;
unwinding the JIT-compiled code; and
responsive to a determination that unwinding of the JIT-compiled code is complete, resuming unwinding of the native stack; and
f) responsive to encountering a JIT-compiled process to be profiled, send a notification identifying the JIT-compiled process from the kernel space profiler to the process inspector; and
g) provide results of the unwinding to the stack reader.

34. The system of claim 33, wherein the native stack references code associated with at least two different computer languages, and wherein each computer language is selected from the group consisting of:
an interpreted language; and
a JIT-compiled language.

35. The system of claim 34, wherein the JIT-compiled language is Java.

36. A system for performance profiling, comprising:
a stack reader;
a storage device;
a processor, communicatively coupled to the stack reader and to the storage device, configured to:
a) run a sampling profiler to begin unwinding a native stack associated with at least one process to be profiled;
b) responsive to a determination that an address of an instruction encountered during the unwinding of the native stack falls within a range of addresses associated with interpreted code, perform the steps of:
stopping unwinding the native stack;
automatically switching to code for unwinding the interpreted code, wherein automatically switching to code for unwinding the interpreted code comprises:
identifying an unwinder for the interpreted language found in the interpreted code; and
initiating the identified unwinder for the interpreted language found in the interpreted code;
unwinding the interpreted code; and
responsive to a determination that unwinding of the interpreted code is complete, resuming unwinding of the native stack;
c) responsive to a determination that an address of an instruction encountered during the unwinding of the native stack falls within a range of addresses associated with Just-In-Time-compiled (JIT-compiled) code, perform the steps of:
stopping unwinding the native stack;
automatically switching to code for unwinding the JIT-compiled code, wherein automatically switching to code for unwinding the JIT-compiled code comprises:
identifying an unwinder for the JIT-compiled language found in the JIT-compiled code; and
initiating the identified unwinder for the JIT-compiled language found in the JIT-compiled code;
unwinding the JIT-compiled code; and
responsive to a determination that unwinding of the JIT-compiled code is complete, resuming unwinding of the native stack;
d) upon completion of unwinding of a stack:
generate a hash of the stack;
determine whether the generated hash matches a previously stored hash;
responsive to the generated hash matching a previously stored hash, cause the storage device to increment a count associated with the previously stored hash; and
responsive to the generated hash not matching a previously stored hash, cause the storage device to store the hash and initialize a count associated with the stored hash; and
e) provide results of the unwinding to the stack reader;
wherein providing results of the unwinding to the stack reader comprises:
providing stack contents to the stack reader; and
providing counts associated with the stack contents to a stack count reader.

* * * * *